O. PEDERSON,
Assignor, to R. G. JORDAN and D. C. MEEHAN.
FURNITURE CASTER
No. 10,304. Reissued Apr. 3, 1883.
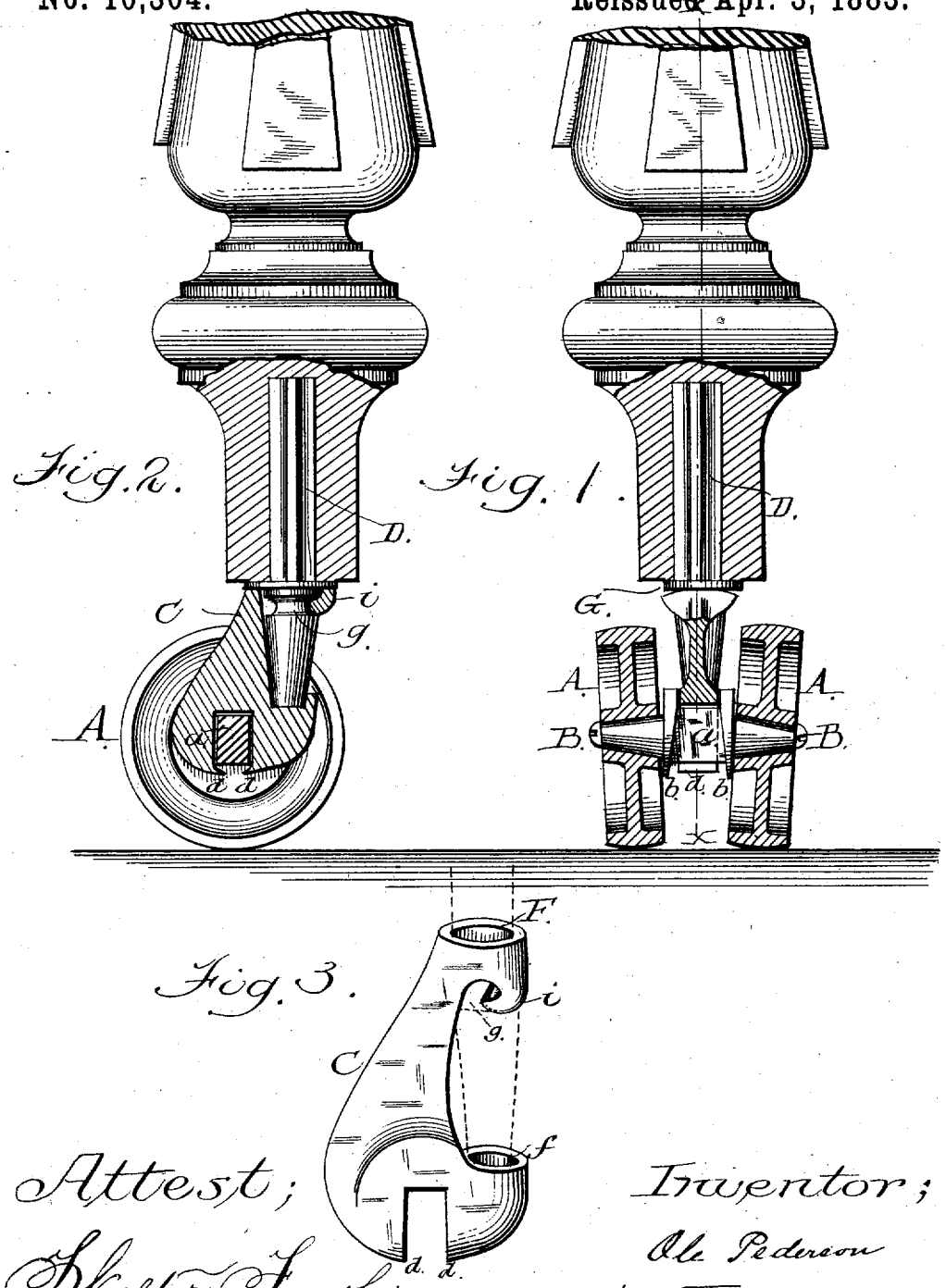
Attest;
Walter Fowler,
H. B. Appleewhaite,
Inventor;
Ole Pederson
per Attys.
A. H. Evans & Co.
N. PETERS, Photo-Lithographer, Washington, D. C.

UNITED STATES PATENT OFFICE.

OLE PEDERSON, OF COLUMBUS, OHIO, ASSIGNOR TO ROBERT G. JORDAN AND DAVID C. MEEHAN, OF SAME PLACE.

FURNITURE-CASTER.

SPECIFICATION forming part of Reissued Letters Patent No. 10,304, dated April 3, 1883.

Original No. 266,509, dated October 24, 1882. Application for reissue filed February 19, 1883.

*To all whom it may concern:*

Be it known that I, OLE PEDERSON, of Columbus, in the county of Franklin and State of Ohio, have invented certain new and useful Improvements in Furniture-Casters; and I do hereby declare the following to be a full, clear, and exact description of the same, reference being had to the accompanying drawings, making part of this specification, in which—

Figure 1 is an elevation of a caster, partially in section, with my improvements attached. Fig. 2 is a section of the same through *x x* of Fig. 1. Fig. 3 is a view of the shank detached from the pivot-bar.

My invention relates to certain improvements in furniture-casters, and is an improvement on my Patent No. 218,565, issued to me August 12, 1879; and it consists in the arrangement and combination of devices hereinafter explained and claimed.

To enable others skilled in the art to make and use my invention, I will proceed to describe the exact manner in which I have carried it out.

Referring to the drawings, A A are the ground-rollers of the caster. B B are the conical pivots carrying the rollers A A. C is the shank of the caster, and D its vertical stem. The pivots B B are rigidly united by an axle or connecting-bar, *a*, cast solid with the pivots, and with the flanges or washers *b b*.

In my patent above referred to I describe and claim the rollers as first cast and cleaned, and then set up in the mold in which the shank of the caster is to be cast, allowing the liquid metal to form the shank, and at the same time to flow through the eyes of the rollers A A, thus making the shank and pivots in one solid piece, which I find from experience to be a difficult and costly method of construction.

To overcome this difficulty is the object of my present invention, in which I cast and finish up each of the several parts of my caster separately, and then put them together, as hereinafter explained.

The pivots B B are cast solid with the connecting-bar *a* and flanges *b b*. The central portion, *a*, between the washers, may be cast nearly rectangular in cross-section, as shown in Fig. 2. The shank C is formed with a slot, C′, at its lower end, and may be horizontal, with the lips *d d* fitting loosely over the central bar, *a*, the lips being sufficiently long to extend slightly below the lower edges of the bar. Now, to attach the shank to the bar *a* it is only necessary to place the shank over the bar and upset the points or lips *d d* until they partially inclose the bar on each side, as shown in Fig. 2.

It is evident that while the hold which the lips have upon the lower sides of the bar *a* may be comparatively slight, yet, as the only purpose sought is to prevent the bar *a* from slipping or falling away from the shank, the strength of the hold will be found to be amply sufficient. Other means than the lips may be used for securing the bar. By these simple means I am enabled to cast the shank, the pivots, and the wheels separately, finishing them up separately, and then quickly attach the parts together, ready for use, thus greatly cheapening the cost of the caster without detracting in the least from its efficiency.

The shank C is constructed with the collar F and step *f* to receive the stem D. The stem D is provided with the solid flange G, which rests upon the collar F while the end of the stem is resting in the step *f*. Around the stem D is formed a groove, *g*. After the stem is in position, as shown in Figs. 1 and 2, the malleable metal lip *i* on the collar F is forced into the groove *g*, by which means the stem is securely held in position, as shown in Fig. 2. The rollers may be secured in position on the pivots by screws or any other well-known means. The flanges *b b*, cast upon the axle, are wider apart at the bottom than at the top, for the purpose of securing to the shank C a lateral oscillation directly on the axle of the caster and between the wheels.

Having thus described my invention, what I claim as new, and desire to secure by Letters Patent, is—

1. The shank C, provided with the collar having the malleable metal lip *i* and the step *f*, in combination with the stem D, provided with the groove *g*, substantially as and for the purpose set forth.

2. In a furniture-caster, the rollers A A and the pivots B B, rigidly connected by the rectangular bar *a*, and provided with the flanges *b b*, in combination with the shank C, slotted at its lower end, and provided with lips *d d*, all constructed to operate substantially as and for the purpose herein described.

3. In a furniture-caster, the shank C, having its lower end slotted, and provided with the lips *d d*, in combination with the pivots or axle provided with the flanges *b b*, whereby the caster is secured oscillation directly on its shaft, as herein described.

4. The shank C, provided with a slot at its lower end, in combination with the central bar, substantially as described.

OLE PEDERSON.

Witnesses:
GEO. C. MATHER,
J. M. LOWE.